J. PARKER.
VARIABLE SPEED GEARING.
APPLICATION FILED AUG. 27, 1914.
1,196,882.
Patented Sept. 5, 1916.
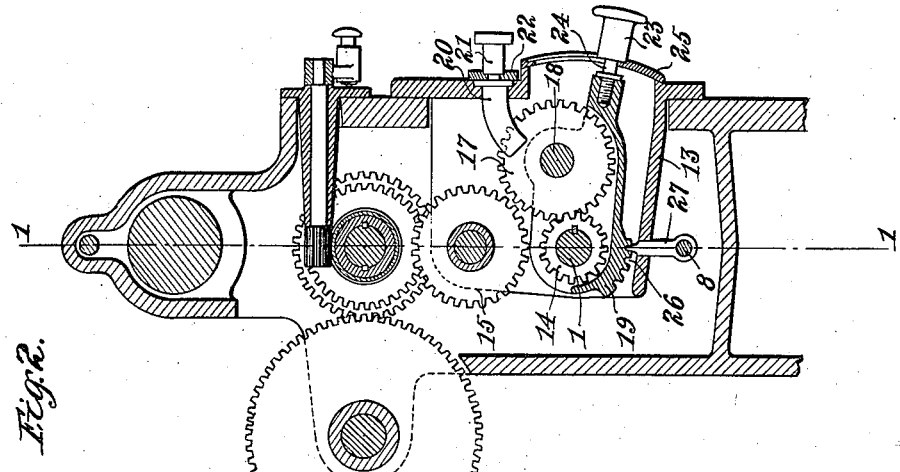
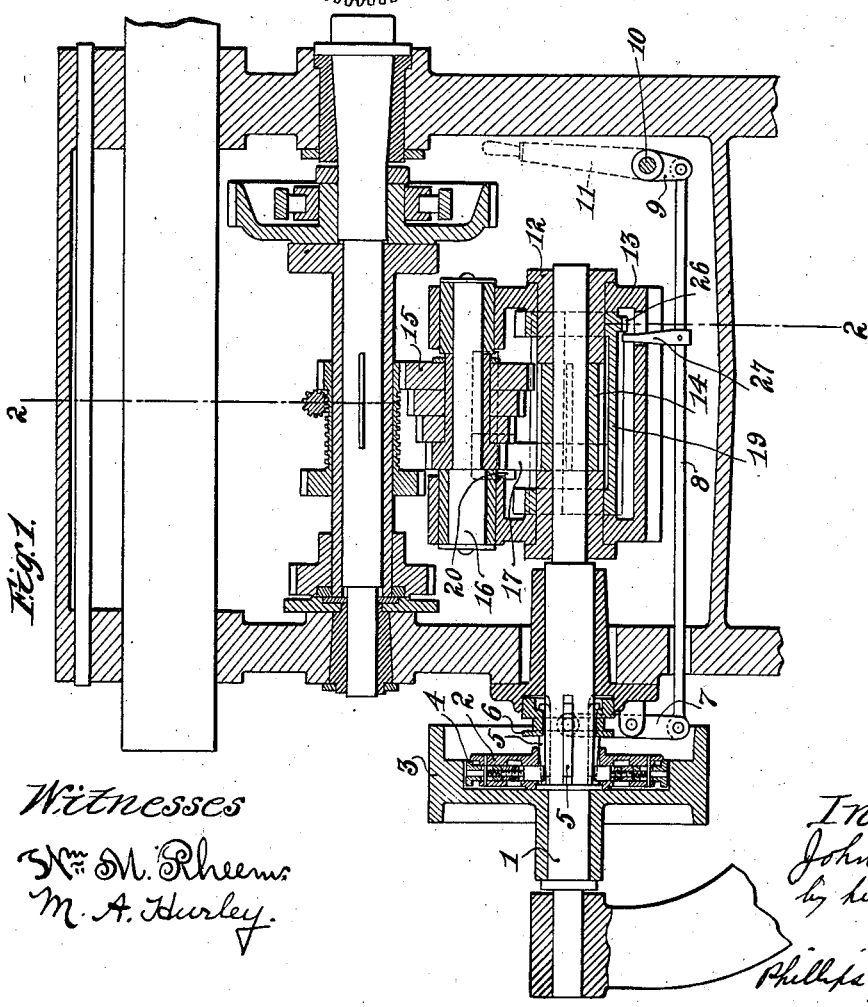
Witnesses
Wm. M. Rheem.
M. A. Hurley.
Inventor
John Parker
by his Attorneys
Phillips Van Leuven & Fish

UNITED STATES PATENT OFFICE.

JOHN PARKER, OF CRANSTON, RHODE ISLAND, ASSIGNOR TO BROWN AND SHARPE MANUFACTURING COMPANY, OF PROVIDENCE, RHODE ISLAND, A CORPORATION OF RHODE ISLAND.

VARIABLE-SPEED GEARING.

1,196,882.  Specification of Letters Patent.  Patented Sept. 5, 1916.

Application filed August 27, 1914. Serial No. 858,976.

*To all whom it may concern:*

Be it known that I, JOHN PARKER, a subject of the King of Great Britain, residing at Cranston, in the county of Providence and State of Rhode Island, have invented certain new and useful Improvements in Variable-Speed Gearing; and I do hereby declare the following to be a full, clear, and exact description of the invention, such as will enable others skilled in the art to which it appertains to make and use the same.

The invention relates to variable speed gearing, and more particularly to safety devices for preventing injury to the gears in changing from one speed to another.

Variable speed gearing such as is used in machine tools and similar machines is usually driven through a clutch or analogous driver which may be disconnected by the operator, and the change from one speed to another is usually effected by relatively shifting gears. To avoid breaking or injuring the gears, the clutch or other driver should be disengaged or disconnected when the shiftable gear is moved out of and into mesh with the coöperating gear or gears in effecting a change in speed.

It is accordingly the object of the present invention to insure the throwing out of the driver whenever the shiftable gear is to be shifted from engagement with one gear or set of gears into engagement with another gear or set of gears.

To this end, the invention contemplates the provision, in a variable speed mechanism comprising a driver and relatively shiftable gears, of means for preventing the shifting of the gears while the driver is in driving connection with the gearing and permitting the shifting of the gears when the driver is disconnected or thrown out. Any suitable preventing means may be employed which is operated or controlled by the throwing in and out of the driver. It is preferred, however, to employ a locking device for retaining the gears in engagement which is so connected with the mechanism through which the operator throws the driver into and out of operation that it is operated to release or unlock the gears in throwing the driver out of operation and to re-lock the gears in throwing the driver into operation.

The features of the invention outlined above as well as the further features relating more or less to the specific embodiment of the invention shown will be readily understood from an inspection of the accompanying drawings and the following detailed description of the mechanism illustrated therein.

In the drawings, Figure 1 is a vertical sectional view on line 1—1, Fig. 2, showing a mechanism embodying the invention in its preferred form; and Fig. 2 is a sectional view on line 2—2, Fig. 1.

In the drawings, the invention is shown as embodied in a variable speed gearing for driving the spindle of a milling machine which has the same construction as the gearing shown and described in Patent No. 1,032,698, July 16, 1912. In this construction, the driving shaft 1 of the variable speed gearing is driven through a clutch 2 secured to the shaft and adapted to engage a driving pulley 3 loosely mounted on the shaft. The clutch is provided with radially movable shoes 4 which are operated to engage or disengage the pulley by slides 5 connected with the clutch-operating sleeve 6. The sleeve is operated to engage or disengage the clutch through a lever 7, the upper end of which carries a pin or pins for engaging a groove in the sleeve, and the other end of which is connected by a link 8 to an arm 9 secured to a rock shaft 10. The rock shaft also carries an operating handle 11 arranged within convenient reach of the operator.

The driving shaft 1 passes through bearing bushings 12 secured in a casing 13, and an elongated gear 14 is secured to the shaft between the ends of the bushings. A cone gear 15 comprising four gears of different sizes is mounted on a shaft 16 in the casing 13 and is so arranged that any one of its gears may be connected with the gear 14 by a shiftable tumbler gear 17. The shiftable gear 17 is loosely mounted on a shaft 18 so that it may be shifted laterally to bring it into position to intermesh with any one of the gears of the cone gear 15. The shaft 18 is carried in a bracket 19 which is journaled on the bushings 12 so that the gear 17 remains in engagement with the gear 14 as the bracket is swung upon its journals to engage or disengage the gear 17 and the gears of the cone gear 15. The lateral position of the gear 17 on the shaft 18 is determined by a slide 20 mounted in the front of the casing 13 and provided with arms arranged on opposite sides of the gear. The slide is held in position by a sleeve 21 which is mounted to slide on a stud projecting from the slide through a longitudinal slot in a locking plate 22, the sleeve being adapted to register with locking recesses in the locking plate. The bracket 19 is swung about its axis to disengage the gear 17 from any one of the gears of the cone gear 15 and to reengage it with another of said gears by means of a sleeve 23 mounted to slide on a stud 24 which projects from the bracket through a vertical slot in the locking plate 25, the sleeve being adapted to register with the locking recesses in the locking plate.

In order that the shifting of the gear 17 from one gear of the cone gear 15 to another may be prevented so long as the driving clutch remains in engagement with the driving pulley, the bracket 19 is provided with a series of locking notches 26 corresponding to the position of the bracket when the gear 17 is in engagement with the different gears of the cone gear, and a coöperating locking finger 27 is secured to the link 8 of the clutch-operating mechanism. The arrangement of the locking devices is such that the finger 27 will engage one of the notches 26 when the clutch is engaged, and will retain the shiftable gear 17 in engagement with the corresponding gear of the cone gear. Before the gear 17 can be disengaged from this gear of the cone gear and reëngaged with another, the clutch-operating mechanism must be shifted to disengage the clutch. This moves the locking finger 27 out of the notch 26 so that the bracket 19 is free to be moved to enable the gear 17 to be shifted into engagement with any gear of the cone gear. After the desired adjustment has been made, the reëngagement of the clutch engages the locking finger 27 with one of the notches 26 and again prevents the shifting of the gear until the clutch is again disengaged.

While it is preferred to employ the specific construction and arrangement of the parts shown and described in embodying the invention in the form of gearing shown and described, it will be understood that this construction and arrangement is not essential to the broader features of the invention and may be varied and modified as found desirable or best suited to the construction and arrangement of the varied speed gearing in which it is embodied.

Having explained the nature and object of the invention and specifically described one form of mechanism in which it may be embodied, what is claimed is:—

1. Variable speed mechanism, having, in combination, a driver, variable speed gearing driven therefrom including a cone gear and a shiftable gear mounted for lateral movement and for movement toward and from the axis of the cone gear, mechanism for throwing the driver into and out of operation, and means controlled by said mechanism for preventing movement of the shiftable gear toward and from the axis of the cone gear when the driver is in.

2. Variable speed mechanism having, in combination, a series of gears, a tumbler gear movable toward and from the axes of the series of gears which may be shifted into engagement with any one of the gears, a driver, mechanism for throwing the driver into and out of operation, and means controlled by said mechanism for preventing movement of the tumbler gear toward and from said axes when the driver is in.

3. Variable speed mechanism having, in combination, a driving clutch, clutch operating mechanism, variable speed gearing including a series of gears and a tumbler gear, a swinging bracket carrying the tumbler gear, and a device for locking the bracket connected with the clutch operating mechanism.

4. Variable speed mechanism having, in combination, a driving clutch, variable speed gearing driven therefrom including a cone gear and a tumbler gear for engaging any gear in the cone, a swinging bracket upon which the tumbler gear is mounted, locking notches on the bracket, a locking finger for engaging the notches, and means for disengaging the finger when the clutch is disengaged and reëngaging the finger when the clutch is reëngaged.

JOHN PARKER.

Witnesses:
   LUTHER D. BURLINGAME,
   W. T. LIDDALL.